(12) United States Patent
Kang (10) Patent No.: US 11,385,997 B2
(45) Date of Patent: Jul. 12, 2022

(54) CONTROLLER FOR MANAGING SUPER BLOCK, MEMORY SYSTEM HAVING THE SAME, AND OPERATING METHOD THEREOF

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 111 days.

(21) Appl. No.: 16/690,643

(22) Filed: Nov. 21, 2019

(65) Prior Publication Data
US 2021/0004323 A1    Jan. 7, 2021

(30) Foreign Application Priority Data
Jul. 2, 2019    (KR) .................. 10-2019-0079680

(51) Int. Cl.
*G06F 12/00*    (2006.01)
*G06F 12/02*    (2006.01)
*G06F 12/0871*   (2016.01)
*G06F 11/07*    (2006.01)
*G06F 3/06*     (2006.01)

(52) U.S. Cl.
CPC .......... *G06F 12/0246* (2013.01); *G06F 3/064* (2013.01); *G06F 3/0614* (2013.01); *G06F 3/0659* (2013.01); *G06F 3/0679* (2013.01); *G06F 11/076* (2013.01); *G06F 12/0871* (2013.01); *G06F 2212/7202* (2013.01)

(58) Field of Classification Search
CPC ............. G06F 12/0246; G06F 12/0871; G06F 11/076; G06F 3/0679; G06F 3/0614; G06F 3/0659; G06F 3/064; G06F 2212/7202; G06F 2212/7208; G06F 2212/1016; G06F 2212/1032; G06F 2212/7205; G06F 3/0649; G06F 3/061; G06F 12/0253; G06F 13/1673; G06F 13/385; G06F 13/4282
USPC ....................................................... 711/154
See application file for complete search history.

(56) References Cited

U.S. PATENT DOCUMENTS 8,095,765 B2    1/2012   Asnaashari et al.
2016/0179401 A1*   6/2016   Zhang .................. G06F 3/0688
                                                                711/103
(Continued)

FOREIGN PATENT DOCUMENTS

KR    10-2017-0095524    8/2017
KR    10-2018-0060370    6/2018

*Primary Examiner* — Mardochee Chery
(74) *Attorney, Agent, or Firm* — IP & T Group LLP (57) ABSTRACT

There are provided a controller, a memory system having the same, and an operating method thereof. The controller includes a read counter configured to store a block read count value of a super block and memory blocks within a non-super block as a status information in an internal memory by counting a number of times that a read operation is performed on the memory blocks; and a super block manager configured to: store a super block reclaim trigger reference and a non-super block reclaim trigger reference, which is set for the super block and the non-super block, as the status information in the internal memory, divide data stored in the memory blocks into hot data and cold data according to the block read count value, and copy the hot data in the non-super block to the super block according to the status information.

18 Claims, 9 Drawing Sheets

(56) References Cited

U.S. PATENT DOCUMENTS

2018/0357160 A1* 12/2018 Gorobets ............ G06F 12/0246
2019/0129768 A1*  5/2019 Novogran ........... G06F 11/3013

* cited by examiner

CONTROLLER FOR MANAGING SUPER BLOCK, MEMORY SYSTEM HAVING THE SAME, AND OPERATING METHOD THEREOF

CROSS-REFERENCE TO RELATED APPLICATION

The present application claims priority under 35 U.S.C. § 119(a) to Korean patent application number 10-2019-0079680 filed on Jul. 2, 2019, which is incorporated herein by reference in its entirety.

BACKGROUND

1. Field of Invention

The present disclosure generally relates to a controller, a memory system having the same, and an operating method thereof, and more particularly, to a controller configured to manage a memory device by using a super block scheme, a memory system having the controller, and an operating method of the memory system.

2. Related Art

A memory system may include a memory device and a controller.

The memory device may include a plurality of dies capable of storing data. Each of the dies may include a plurality of memory cells in which data is stored. The memory cells may be implemented as volatile memory cells in which stored data disappears when the supply of power is interrupted, or may be implemented as nonvolatile memory cells in which stored data is retained even when the supply of power is interrupted.

The controller may control data communication between a host and the memory device. For example, the controller may control the memory device in response to a request from the host. Also, the controller may perform a background operation without any request from the host to improve the performance of the memory system. For example, the controller may perform a garbage collection operation or a read reclaim operation.

A garbage collection operation typically may include copying valid data stored in victim blocks to a target block when a number of free blocks is smaller than a reference number, and increasing the number of free blocks by erasing the victim blocks. A read reclaim operation typically may include copying data stored in a block to another block to prevent read disturb of the corresponding block, when a read count value obtained by performing a read operation is greater than a reference value.

The host may typically communicate with the memory device through the controller by using an interface protocol such as a Peripheral Component Interconnect-Express (PCI-E), an Advanced Technology Attachment (ATA), a Serial ATA (SATA), a Parallel ATA (PATA), or a Serial Attached SCSI (SAS). Interface protocols between the host and the memory system are not limited to the above-described examples, and may include various interfaces such as a Universal Serial Bus (USB), a Multi-Media Card (MMC), an Enhanced Small Disk Interface (ESDI), and Integrated Drive Electronics (IDE).

SUMMARY

Various embodiments of the present invention provide a controller capable of improving the performance of a memory system. The controller may dividing data into hot data and cold data and move the hot data to a super block. Various embodiments of the present invention also provide a memory system including the controller and an operating method of the memory system.

In accordance with an aspect of the present disclosure, there is provided a controller including: an internal memory configured to store status information of memory blocks grouped as a super block or a non-super block; a read counter configured to store a block read count value of the super block and the memory blocks within the non-super block as the status information in the internal memory by counting a number of times that a read operation is performed on the memory blocks; and a super block manager configured to: store a super block reclaim trigger reference and a non-super block reclaim trigger reference, which is set for the super block and the non-super block, as the status information in the internal memory, divide data stored in the memory blocks into hot data and cold data according to the block read count value of each memory block within the non-super block, and copy the hot data in the non-super block to the super block according to the status information.

In accordance with another aspect of the present disclosure, there is provided a memory system including: a memory device including a plurality of memory blocks in which data is stored; and a controller configured to: divide data stored in the memory blocks into hot data and cold data according to a block read count value of each of the memory blocks, and control the memory device to copy the hot data stored in a non-super block to a super block.

In accordance with still another aspect of the present disclosure, there is provided a method for operating a memory system, the method including: updating status information of memory blocks, whenever a read operation of the memory blocks is performed; determining data stored in the memory blocks as hot data or cold data according to the status information, when a number of times that the read operation is performed on a memory block reaches a reference number of times among the memory blocks; and copying, to a super block, data of a memory block storing the hot data.

In accordance with another aspect of the present disclosure, there is provided a memory system including: a memory device including first and second groups respectively having first and second memory blocks, wherein a number of the first memory blocks is different from a number of the second memory blocks; and a controller configured to control the memory device to move, during a read reclaim operation, hot data from the second group to the first group when the second group causes the read reclaim operation by a reclaim trigger reference for the first group.

These and other features and advantages of the present invention will become apparent to those skilled in the art of the invention from the following detailed description in conjunction with the following drawings.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art. It is noted that in the drawings, dimensions may be exaggerated for clarity of illustration.

Also, it should be understood that the drawings are simplified schematic illustrations of the described devices and may not include well known details for avoiding obscuring the features of the invention.

Moreover, it should be noted that features present in one embodiment may be used with one or more features of another embodiment without departing from the scope of the invention.

In the following description, like reference numerals refer to like elements throughout the drawings.

DETAILED DESCRIPTION

In the present disclosure, various advantages, features and methods for achieving the advantages and features, will become more apparent after a reading of the following embodiments described in conjunction with the drawings. The present disclosure may, however, be embodied in different forms and should not be construed as being limited to the embodiments set forth herein. Rather, these embodiments are provided to describe the present disclosure in sufficient detail so that those with ordinary skill in the art to which the disclosure pertains may readily practice the technical concept of the present disclosure.

Figure 1:
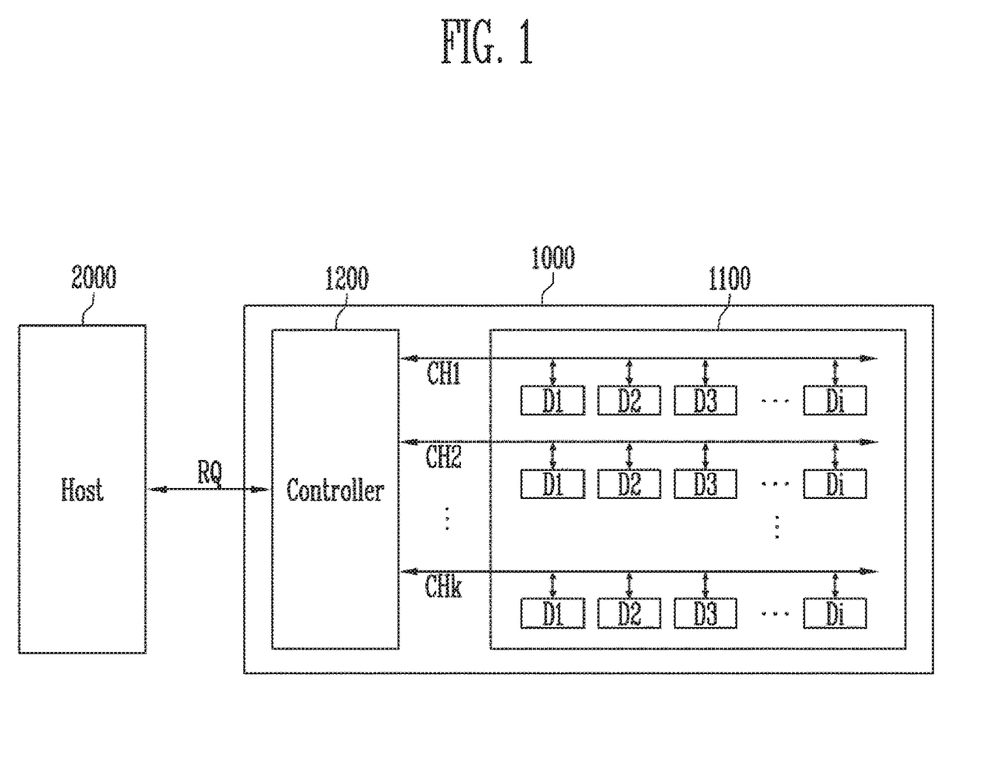
FIG. 1 is a diagram illustrating a memory system in accordance with an embodiment of the present disclosure.

FIG. 1 is a diagram illustrating a memory system 1000 in accordance with an embodiment of the present disclosure.

Referring to FIG. 1, the memory system 1000 may include a memory device 1100 configured to store data and a controller 1200 configured to communicate between the memory device 1100 and a host 2000.

The memory device 1100 may include a plurality of dies D1 to Di (i is a positive integer). The dies D1 to Di may be implemented with a volatile memory device in which stored data disappears when the supply of power is interrupted or a nonvolatile memory device in which stored data is retained even when the supply of power is interrupted. In the following embodiments, the dies D1 to Di implemented with the nonvolatile memory device will be described as an example. The nonvolatile memory device may be a NAND flash memory device.

The dies D1 to Di may be coupled to the controller 1200 through a plurality of channels CH1 to CHk (k is a positive integer). For example, first to ith dies D1 to Di may be coupled to a first channel CH1, first to ith dies D1 to Di may be coupled to a second channel CH2, and first to ith dies D1 to Di may be coupled to a kth channel CHk. The first to ith dies D1 to Di coupled to different channels CH1 to CHk may be configured with physically different dies. For example, the first die D1 may be physically different from the first die D1 coupled to the second channel CH2. Memory cells included in the dies D1 to Di may be physically grouped in units of memory blocks, and memory blocks may be logically grouped in units of super blocks to operate. A super block will be described later.

The controller 1200 may communicate between the host 2000 and the memory device 1100. The controller 1200 may control the memory device 1100 in response to a request RQ from the host 2000, or perform a background operation for improving the performance of the memory system 1000 without any request from the host 2000. Also, the controller 1200 may divide data stored in the memory device 1100 into hot data and cold data, and move hot data stored in a non-super block to a super block. This operation may be performed as a background operation.

The host 2000 may generate requests RQ for various operations, and output the generated requests RQ to the memory system 1000. For example, the requests RQ may include a program request capable of controlling a program operation, a read request capable of controlling a read operation, an erase request capable of controlling an erase operation, and the like. The host 2000 may communicate with the memory system 1000 through various interfaces such as a Peripheral Component Interconnect-Express (PCI-E), an Advanced Technology Attachment (ATA), a Serial ATA (SATA), a Parallel ATA (PATA), a Serial Attached SCSI (SAS), or a Non-Volatile Memory Express (NVMe), a Universal Serial Bus (USB), a Multi-Media Card (MMC), an Enhanced Small Disk Interface (ESDI), and an Integrated Drive Electronics (IDE).

Figure 2:
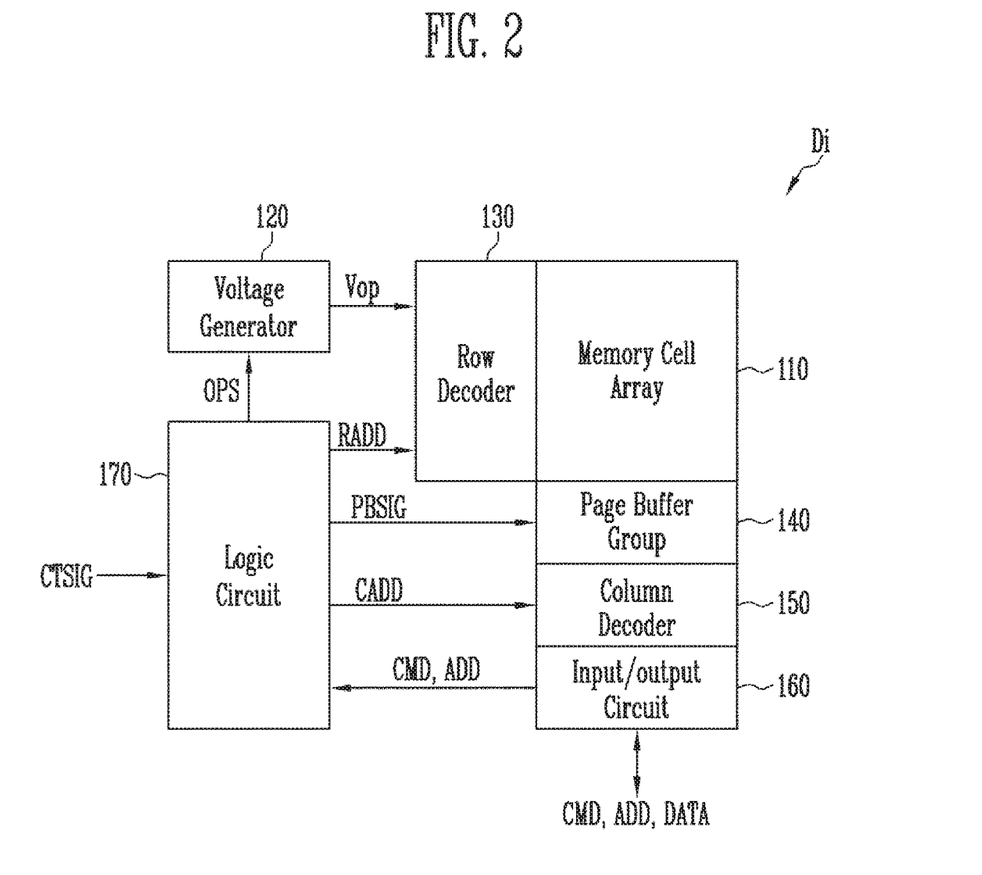
FIG. 2 is a diagram illustrating a die shown in FIG. 1.

FIG. 2 is a diagram illustrating an example of the die shown in FIG. 1.

Any one die Di among the first to ith dies D1 to Di shown in FIG. 1 will be described as an example with reference to FIG. 2.

The die Di may include a memory cell array 110 configured to store data, peripheral circuits 120 to 160 configured to perform a program, read or erase operation, and a logic circuit 170 configured to control the peripheral circuits 120 to 160.

The memory cell array 110 may include a plurality of memory blocks in which data is stored. Each of the memory blocks may include a plurality of memory cells. The memory cells may be implemented in a two-dimensional structure in which the memory cells are arranged in parallel to a substrate. The memory cells may be implemented in a three-dimensional structure in which the memory cells are stacked vertically to a substrate.

The peripheral circuits 120 to 160 may include a voltage generator 120, a row decoder 130, a page buffer group 140, a column decoder 150, and an input/output circuit 160.

The voltage generator 120 may generate and output operating voltages Vop necessary for various operations in response to an operation signal OPS. For example, the voltage generator 120 may generate and output a program voltage, a verify voltage, a read voltage, a pass voltage, an erase voltage, and the like.

The row decoder 130 may select one memory block among the memory blocks included in the memory cell array 110 according to a row address RADD, and transmit operating voltages Vop to the selected memory block through local lines LL (not shown) coupled to the selected memory block.

The page buffer group 140 may include a plurality of page buffers coupled to bit lines BL (not shown), and may temporarily store data in a program or read operation in response to a page buffer control signal PBSIG. Each of the page buffers may include a plurality of latches for temporarily storing data in a program, read, and verify operations.

The column decoder 150 may be coupled to the page buffer group 140 through column lines CL (not shown), and be coupled to the input/output circuit 160 through data lines DL (not shown). For example, the column decoder 150 may transfer data received through the data lines DL in a program operation to the page buffer group 140, or transfer data received through the column lines CL in a read operation to the input/output circuit 160 through the data lines DL.

The input/output circuit 160 may be coupled to the controller 1200 through input/output lines, and input/output a command CMD, an address ADD, and data DATA through the input/output lines. For example, the command CMD and the address ADD, which are received from the controller 1200, may be transmitted to the logic circuit 170 through the input/output circuit 160, and the data DATA received from the controller 1200 may be transmitted to the column decoder 150. In addition, data read from the memory cell array 110 in a read operation may be output to the controller 1200 through the input/output circuit 160.

The logic circuit 170 may output operation signals OPS, a row address RADD, page buffer signals PBSIG, and a column address CADD in response to control signals CTSIG, a command CMD, and an address ADD.

Figure 3:
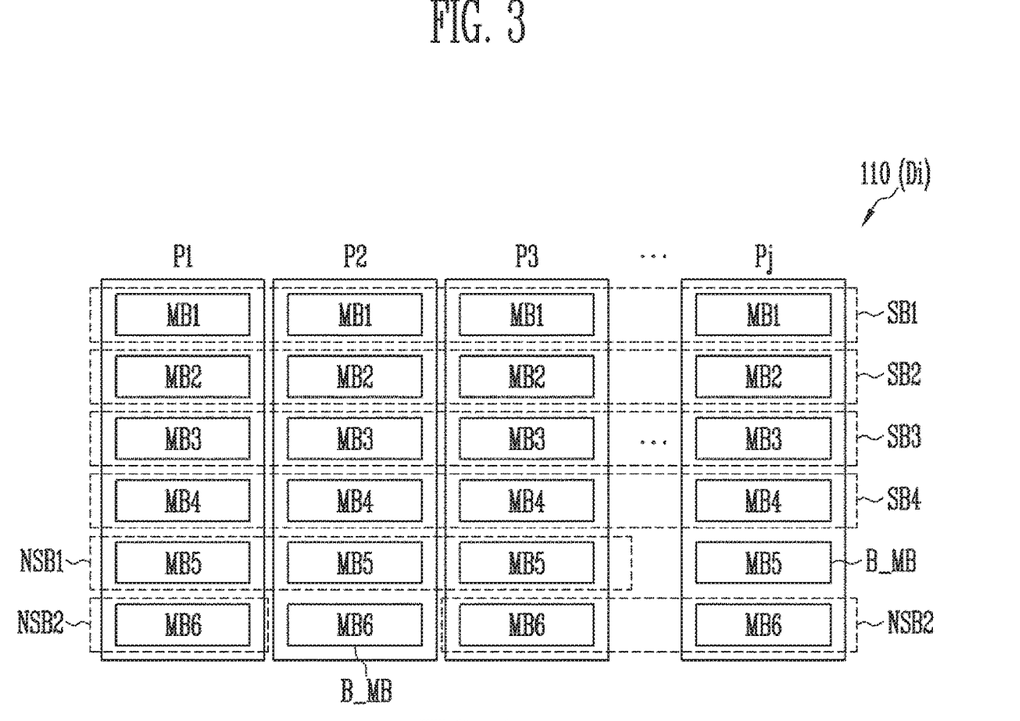
FIGS. 3 and 4 are diagrams illustrating a super block and a non-super block.
Figure 4:
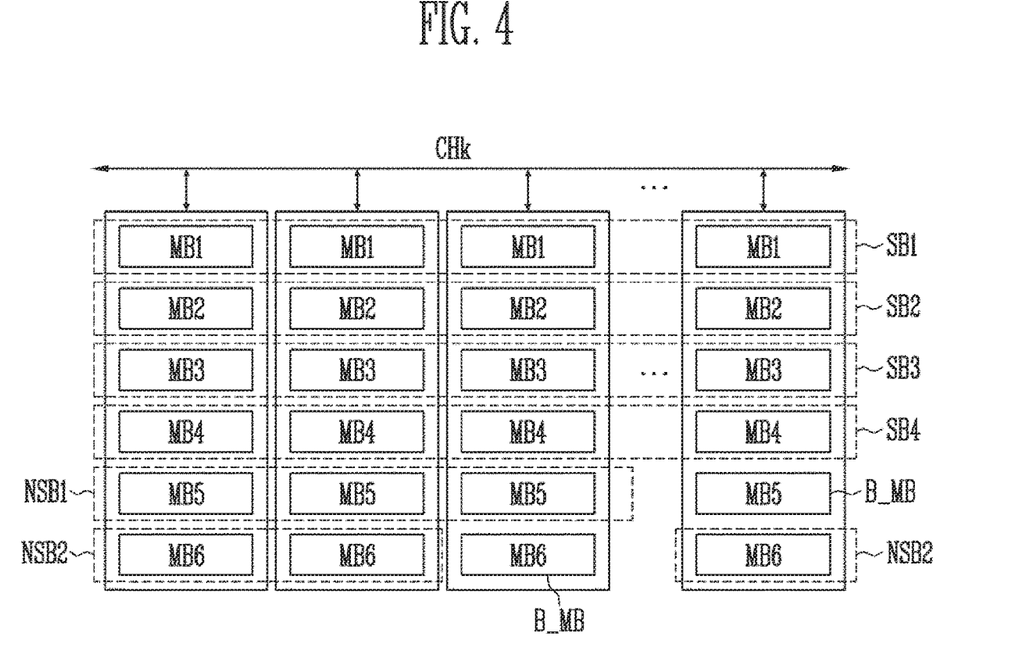

FIGS. 3 and 4 are diagrams illustrating a super block and a non-super block.

Referring to FIG. 3, a memory cell array 110 may include a plurality of planes P1 to Pj (j is a positive integer). For example, the memory cell array 110 may include first to jth planes P1 to Pj, and each of the first to jth planes P1 to Pj may include a plurality of memory blocks MB1 to MB6. In FIG. 3, a case in which first to sixth memory blocks MB1 to MB6 are included in one plane is illustrated for convenience of description, but the number of memory blocks in each plane is not limited to that shown in FIG. 3. The first to jth planes P1 to Pj are groups physically independent from each other. Some of the memory blocks included in different planes may be grouped as a single super block in which the memory blocks can logically operate simultaneously.

For example, one or more planes may be included in one die. A structure in which one plane is included in one die is referred to as a single plane structure, and a structure in which two or more planes are included in one die is referred to as a multi-plane structure. FIG. 3 illustrates the memory cell array 110 of the ith die Di having a multi-plane structure.

When the first to jth planes P1 to Pj are included in the ith die, memory blocks respectively included in the first to jth planes P1 to Pj may be grouped to constitute one super block (any one of SB1 to SB4). For example, first memory blocks MB1 respectively included in the first to jth planes P1 to Pj may constitute a first super block SB1, and second memory blocks MB2 respectively included in the first to jth planes P1 to Pj may constitute a second super block SB2. In this manner, some blocks among the first to sixth memory blocks included in the first to jth planes P1 to Pj may be respectively grouped as first to fourth super blocks SB1 to SB4.

The other memory blocks that are not included in the first to fourth super blocks SB1 to SB4 in the first to jth planes P1 to Pj may be grouped as a non-super block. For example, when a bad block B_MB occurs among memory blocks included in a fifth super block (i.e., a super block designated as a next super block of SB4), the other memory blocks except the bad block B_MB in the fifth super block may be set to a first non-super block NSB1. In another embodiment, when the sixth memory block MB6 included in the second plane P2 among memory blocks included in a sixth super block is designated as a bad block, a second non-super block NSB2 configured with the sixth memory blocks MB6 included in the first and third to jth planes P1 and P3 to Pj may be set.

For example, the memory blocks included in the first or second non-super block NSB1 or NSB2 may operate simultaneously due to the bad block B_MB. In FIG. 3, a case is illustrated where the first to fourth memory blocks MB1 to MB4 respectively included in the first to jth planes P1 to Pj are included in the first to fourth super blocks SB1 to SB4, by grouping memory blocks having the same number and which are included in different planes to constitute a super block. Also, memory blocks having different numbers may be grouped to constitute a super block. However, one memory block is not included in a plurality of super blocks.

Memory blocks included in the same super block SB can operate simultaneously as if the memory blocks are logically one block, and hence a quantity of data processed in units of super blocks SB for the same time is greater than that of data processed in units of non-super blocks NSB for the same time. For example, a plurality of first memory blocks MB1 included in the first super block SB1 may operate simultaneously. However, because a number of memory blocks grouped as the non-super block NSB is smaller by the number of bad blocks than a number of memory blocks grouped as the super block, the memory blocks grouped as the non-super block NSB cannot operate simultaneously. Therefore, memory blocks which operate simultaneously in units of super blocks SB in the memory system 1000 may be more efficient in terms of operation time and performance, as compared with those memory blocks which are operated in units of non-super blocks NSB in the memory system 1000.

Referring to FIG. 4, a super block SB may be configured with memory blocks included in a plurality of dies. Memory blocks included in each of the first to ith dies D1 to Di may be may be grouped in units of super blocks SB, and memory blocks that are not included in the super blocks SB may be grouped as a non-super block NSB. For example, first memory blocks MB1 included in the first to ith dies D1 to Di may constitute a first super block SB1, and second memory blocks MB2 included in the first to ith dies D1 to Di may constitute a second super block SB2. In this manner, first to fourth memory blocks MB1 to MB4 respectively included in the first to ith dies D1 to Di may be included in first to fourth super blocks SB1 to SB4. Therefore, when memory blocks included in different dies are included in the same super block, the memory blocks may operate simultaneously.

Memory blocks (e.g., MB5 and MB6) that are not included in the first to fourth super blocks SB1 to SB4 among the memory blocks included in the first to ith dies D1 to Di may be included in a first or second non-super block NSB1 or NSB2. The memory blocks (e.g., MB5 and MB6)

included in the first or second non-super block NSB1 or NSB2 cannot operate simultaneously. Therefore, although data having the same capacity is programmed or read, a method for simultaneously selecting memory blocks in units of super blocks SB is more efficient than a method for selecting each of the memory blocks grouped as the non-super block NSB.

Figure 5:
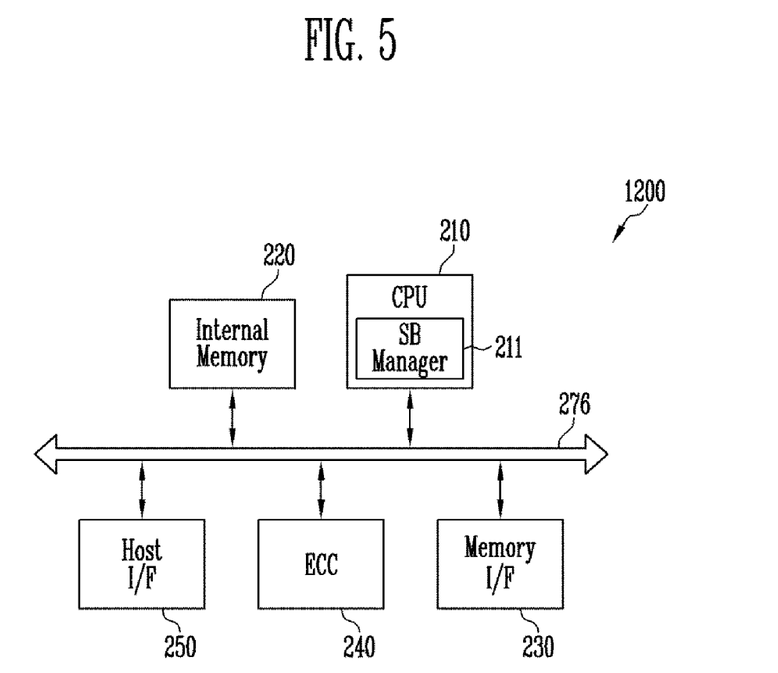
FIG. 5 is a diagram illustrating a controller in accordance with an embodiment of the present disclosure.

FIG. 5 is a diagram illustrating a controller in accordance with an embodiment of the present disclosure.

Referring to FIG. 5, the controller 1200 may include a Central Processing Unit (CPU) 210, an internal memory 220, a memory interface (I/F) 230, an Error Correction Circuit (ECC) 240, and a host interface (I/F) 250, which communicate with each other through a bus 276.

The CPU 210 may control the memory device 1100 in response to a request RQ from the host 2000 shown in FIG. 1. For example, when a request RQ is received from the host 2000, the CPU 210 may generate and output a program command, a read command, an erase command, or the like, which is used to control the memory device in response to the received request RQ. When any request is not received from the host 2000, the CPU 210 may perform a background operation for improving the performance of the memory system 1000 shown in FIG. 1. For example, the CPU 210 may generate and output commands for performing garbage collection or read reclaim operations.

In particular, when a read reclaim operation is performed, the CPU 210 may divide data stored in a non-super block into hot data and cold data, and copy the hot data to a super block. In order to perform this operation, the CPU 210 of this embodiment may include a super block (SB) manager 211. The SB manager 211 may divide data according to an algorithm for distinguishing hot data and cold data from each other, and control an operation of copying the hot data to a super block by using various information of memory blocks on which read reclaim is to be performed. Hot data means data having a read operation performed thereon a large number of times. Cold data means data having a read operation performed thereon a small number of times.

The internal memory 220 may temporarily store various data necessary for an operation of the controller 1200, or temporarily store data in a program or read operation. For example, the internal memory 220 may be implemented with a DRAM, an SRAM, or a nonvolatile memory. The internal memory 220 may store various addresses necessary for an operation of the memory system 1000, and store and update various status information of memory blocks corresponding to each address. For example, the internal memory 220 may include a mapping table of logical and physical addresses and a plurality of tables in which status information of memory blocks are stored. Information of memory blocks, which are stored in the internal memory 220, may include type information of each of the memory block, a reclaim trigger reference, a block read count value, a system read count value, and the like. The type information of memory blocks may be used as an index for each table, and may distinguish a super block and a non-super block from each other. The reclaim trigger reference may represent that read reclaim is triggered based on the super block or the non-super block. The block read count value is a read count value of the super block at a point in time when a memory block is allocated, or is a read count value of a memory block included in the non-super block. The system read count value is a read count value of the memory system, which may be a number of times a read operation of the host request for the memory system is performed.

The SB manager 211 included in the CPU 210 may update information for the tables stored in the internal memory 220, and control an operation of copying hot data stored in the non-super block by using the information from the tables and copying the extracted hot data to the super block.

The memory I/F 230 may exchange a command, an address, and data between the controller 1200 and the memory device 1100. For example, the memory I/F 230 may communicate with a selected die of the memory device 1100 through channels CH.

The ECC 240 may detect and correct an error of data in a program or read operation. For example, the ECC 240 may encode data received from the host 2000 in the program operation, and decode data received from the memory device 1100 in the read operation. A Low-Density Parity Check (LDPC) code may be used for encoding or decoding, and an error correction operation using various types of codes in addition to the LDPC code may be performed.

The host I/F 250 may communicate a request, an address, and data DATA between the controller 1200 and the host 2000. For example, the host I/F 250 may include various interfaces such as Peripheral Component Interconnect-Express (PCI-E), Advanced Technology Attachment (ATA), Serial ATA (SATA), Parallel ATA (PATA), Serial Attached SCSI (SAS), Non-Volatile Memory Express (NVMe), a Universal Serial Bus (USB), a Multi-Media Card (MMC), an Enhanced Small Disk Interface (ESDI), and Integrated Drive Electronics (IDE).

Figure 6:
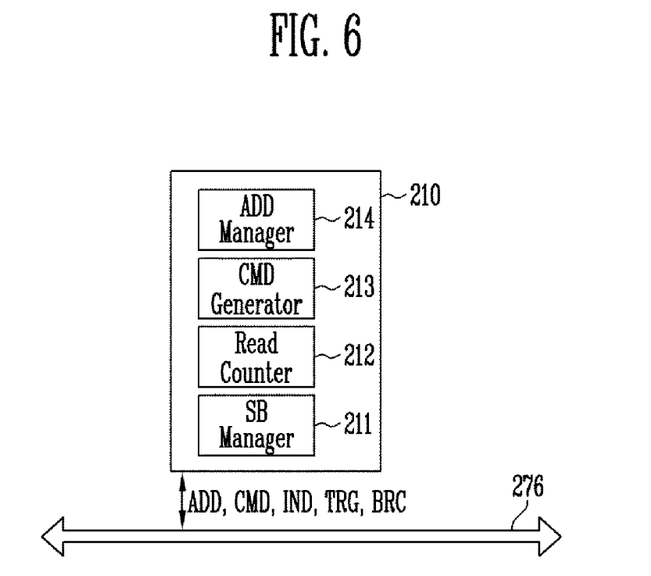
FIG. 6 is a diagram illustrating an example of a central processing unit shown in FIG. 5.

FIG. 6 is a diagram illustrating an example of the CPU shown in FIG. 5.

Referring to FIG. 6, the CPU 210 may include a read counter 212, a command (CMD) generator 213, and an address (ADD) manager 214, in addition to the SB manager 211 described above.

The SB manager 211 may update a reclaim trigger reference TRG according to an index IND, and control an operation of copying hot data stored in a non-super block to a super block by determining whether data stored in a memory block is hot data or cold data, based on a block read count value BRC and a system read count value SRC.

The read counter 212 may count, as a block read count value BRC, a number of times a read operation is performed in each of memory blocks or super blocks, and update the counted value in the internal memory 220. Also, the read counter 212 may count, as a system read count value SRC, a number of times a read operation is performed in the memory system 1000, and update the counted value in the internal memory 220. The system read count value SRC may be accumulated and updated whenever a memory block is selected to perform a program operation.

The CMD generator 213 may generate various commands in response to a request RQ received from the host 2000 shown in FIG. 1, and generate various commands CMD necessary for a background operation. Also, the CMD generator 213 may generate and output commands for copying, to a super block, data of a memory block in which hot data is stored among memory blocks included in a non-super block.

The ADD manager 214 may map a logical address used in the host 2000 to a physical address used in the memory system 1000, and store and update the mapped addresses ADD in the internal memory 220.

Figure 7:
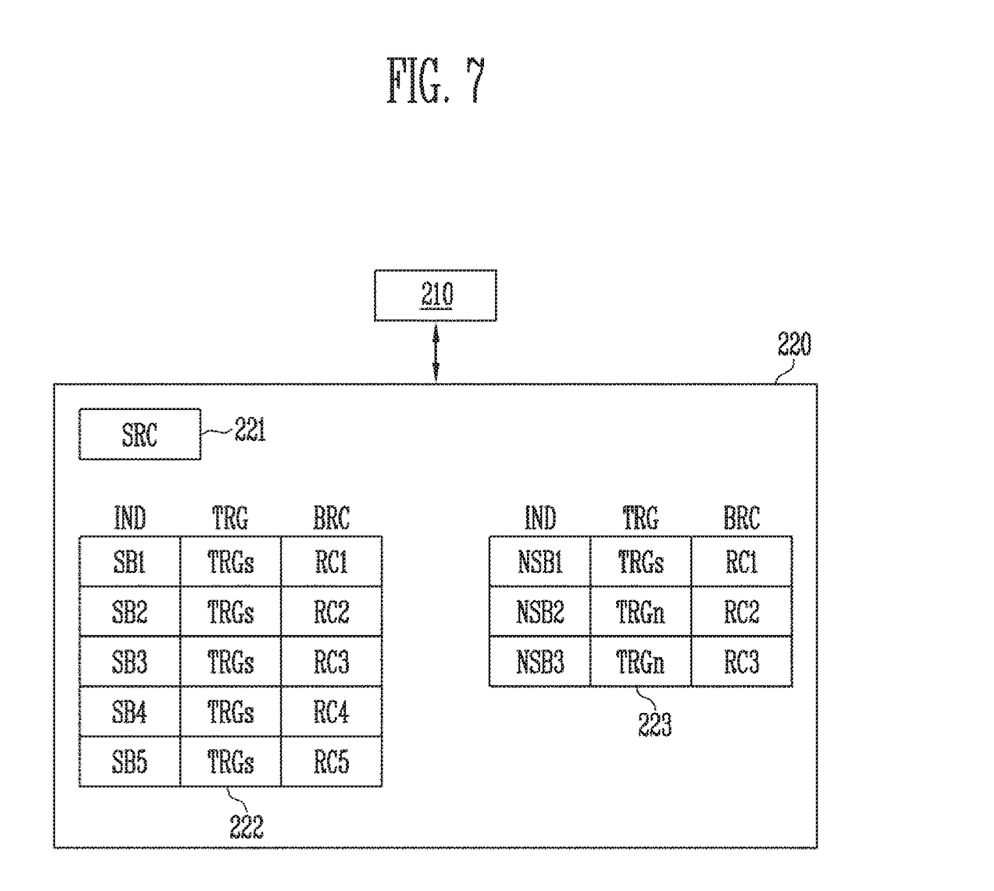
FIG. 7 is a diagram illustrating status information stored in an internal memory.

FIG. 7 is a diagram illustrating status information stored in the internal memory.

Referring to FIG. 7, the internal memory 220 may store a mapping table of memory blocks and status information, and tables 221 to 223 in which the status information is stored are illustrated in FIG. 7.

The tables 221 to 223 may include a system read count table 221, a super block table 222, and a non-super block table 223.

A system read count value SRC with respect to a number of times a read operation is performed in the memory system 1000 may be stored in the system read count table 221. For example, the system read count value SRC may be a number of times, which is accumulated whenever the memory system 1000 performs a read operation in response to a read request from the host 2000.

The super block table 222 and the non-super block table 223 may be distinguished according to a super block (SB) index IND and a non-super block (NSB) index IND.

A reclaim trigger reference TRG and a block read count value BRC may be stored in each of the super block table 222 and the non-super block table 223.

The reclaim trigger reference TRG means a read reclaim trigger reference of a super block or a non-super block in which a memory block is included, when the memory block is allocated to the super block or the non-super block. The reclaim trigger reference TRG may be divided into a super block reclaim trigger reference TRGs, a non-super block reclaim trigger reference TRGn, and an undesignated value UD. For example, when a memory block is allocated to a super block for a program operation, the super block reclaim trigger reference TRGs may be applied to the memory block when the memory block is included in a super block. The non-super block reclaim trigger reference TRGn may be applied to a memory block when the memory block is allocated to a non-super block. The reclaim trigger reference TRG may be set to a one bit value. For example, when the reclaim trigger reference TRG is 0, the read reclaim trigger reference may be set as the super block trigger reference TRGs. When the reclaim trigger reference TRG is 1, the read reclaim trigger reference may be set as the non-super block reclaim trigger reference TRGn. When the reclaim trigger reference TRG is null, the read reclaim trigger reference may be set as the undesignated value UD. The reclaim trigger reference TRG may be updated between the super block reclaim trigger reference TRGs and the non-super block reclaim trigger reference TRGn when allocation of a corresponding memory block changes between the super block and the non-super block.

The block read count value BRC is a read count value of a super block SB or each memory block at a point in time when the memory block is allocated to the super block SB or the non-super block NSB. For example, since memory blocks included in the same super block SB operate simultaneously, a read count value of a super block including a memory block may increase, when a read operation of the corresponding memory block is performed. In this embodiment, since memory blocks grouped as a non-super block NSB are managed in units of groups, a read count value of the non-super block may increase, when a read operation of a memory block is performed within the non-super block NSB. Although not illustrated, the non-super block table 223 may further store the block read count value of each individual memory block within the non-super block NSB.

Super blocks SB, non-super blocks NSB, and free blocks FRB, which are shown in FIG. 7, are merely embodiments for helping understanding of the present disclosure, and therefore, it will be understood that the number of blocks is not limited by FIG. 7. An embodiment of each table will be described in detail as follows.

The system read count value SRC is an accumulated count value of a read operation performed by the memory system 1000. Therefore, the system read count value SRC may increase whenever a read operation is performed in a super block SB or non-super block NSB.

When the index IND is divided into first to fifth super blocks SB1 to SB5 in the super block table 222, the reclaim trigger reference TRG of the first super block SB1 is the super block reclaim trigger reference TRGs, and the first super block SB1 has a first read count value RC1. The reclaim trigger reference TRG of the second super block SB2 is the super block reclaim trigger reference TRGs, and the second super block SB2 has a second read count value RC2. In this manner, the reclaim trigger reference TRG and block read count value BRC of each of the first to fifth super blocks SB1 to SB5 may be managed.

When the index IND is divided into first to third non-super blocks NSB1 to NSB3 in the non-super block table 223, the reclaim trigger reference TRG of a first non-super block NSB1 is the non-super block reclaim trigger reference TRGn, and the first non-super block NSB1 has a first read count value RC1. The reclaim trigger reference TRG of a second non-super block NSB2 is the non-super block reclaim trigger reference TRGn, and the second non-super block NSB2 has a second read count value RC2. The reclaim trigger reference TRG of a third non-super block NSB3 is the non-super block reclaim trigger reference TRGn, and the third non-super block NSB3 has a third read count value RC3.

The case in which the reclaim trigger reference TRG of the first non-super block NSB1 is set to the super block reclaim trigger reference TRGs may be a case when the reclaim trigger reference TRG is not updated from the super block reclaim trigger reference TRGs to the non-super block reclaim trigger reference TRGn for the first non-super block NSB1 even after a super block SB becomes the first non-super block NSB1.

In this embodiment, based on status information stored in the above-described tables 221 to 223, a memory block in which hot data is stored may be searched among memory blocks included in a non-super block NSB, and the hot data stored in the corresponding memory block may be copied to a super block SB. For example, hot data or cold data may be distinguished according to a difference value between a block read count value BRC and a system read count value SRC of memory blocks included in the non-super block NSB, when the reclaim trigger reference TRG is set as the super block reclaim trigger reference TRGs. For example, when the calculated difference value is equal to or greater than a hot/cold reference value predetermined in the memory system 1000, the CPU 210 may change the super block reclaim trigger reference TRGs to the non-super block reclaim trigger reference TRGn. When the calculated difference value is less than the hot/cold reference value, the CPU 210 may copy data stored in a corresponding memory block to the super block SB.

Figure 8:
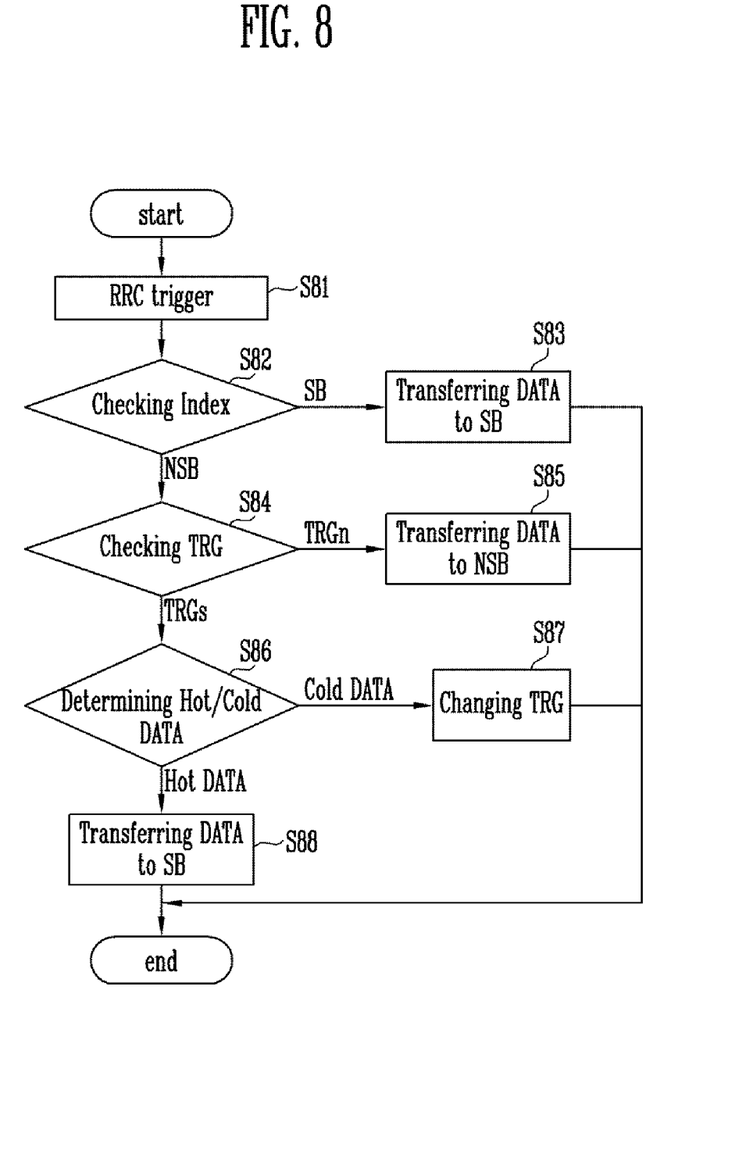
FIG. 8 is a flowchart illustrating an operating method in accordance with an embodiment of the present disclosure.

FIG. 8 is a flowchart illustrating an operating method in accordance with an embodiment of the present disclosure.

Referring to FIG. 8, when read reclaim RRC is triggered when a number of times a read operation for a memory block is performed reaches a reference value (S81), the SB manager 211 shown in FIG. 6 may determine whether the memory block is included in a super block SB or non-super block NSB (S82).

When it is checked that the memory block is a block included in the SB, the CPU 210 shown in FIG. 6 may transmit data DATA stored in the memory block to another super block SB (S83). For example, the CPU 210 may copy the data stored in the memory block to another memory block included in the super block SB, and erase the memory block where the read reclaim RRC is triggered. The another memory block may be a block included in the same super block SB as the memory block where the read reclaim RRC is triggered or a block included in another super block SB.

In the step S82, when it is checked that the memory block is included in the non-super block NSB, the SB manager 211 may check a reclaim trigger reference TRG of the memory block (S84).

When it is checked that the reclaim trigger reference of the memory block is a non-super block reclaim trigger reference TRGn, the CPU 210 may copy the data DATA stored in the memory block to another memory block included in the non-super block NSB, and erase the memory block where the read reclaim RRC is triggered (S85).

When it is checked that the reclaim trigger reference TRG of the non-super block NSB is the super block reclaim trigger reference TRGs, the SB manager 211 may determine whether the data stored in each individual memory block with the non-super block NSB is hot data Hot DATA or cold data Cold DATA within the non-super block NSB (S86). For example, the SB manager 211 may determine hot data or cold data by subtracting a block read count value BRC of the individual memory block with the non-super block NSB from a system read count value SRC and comparing a value calculated from the subtraction with a hot/cold reference value.

Specifically, when the value calculated by subtracting the block read count value BRC of the individual memory block with the non-super block NSB from the system read count value SRC is equal to or greater than the hot/cold reference value, the SB manager 211 may determine the data stored in the individual memory block with the non-super block NSB as cold data Cold DATA. Therefore, when the non-super block NSB is determined to store cold data, the super block manager 211 may change the reclaim trigger reference TRG of the non-super block NSB to the non-super block reclaim trigger reference TRGn in the internal memory 220. That is, as the block read count value BRC becomes smaller, the value calculated by subtracting the block read count value BRC from the system read count value SRC becomes equal to or greater than the hot/cold reference value, which means that a read operation of the individual memory block has been performed a small number of times (Cold DATA). Therefore, the SB manager 211 may change the reclaim trigger reference of the non-super block NSB from the super block reclaim trigger reference TRGs to the non-super block reclaim trigger reference TRGn (S87).

On the contrary, when the value calculated by subtracting the block read count value BRC from the system read count value SRC is less than the hot/cold reference value, the SB manager 211 may determine the data stored in the memory block as hot data Hot DATA. Therefore, when the non-super block NSB is determined to store hot data, the CPU 210 may transmit data stored in the non-super block NSB to a memory block included in the super bloc SB (S88), and erase the memory block where the read reclaim RRC is triggered. The another memory block may be selected from memory blocks grouped as a new super block SB among memory blocks included in the non-super block NSB.

After completion of the operation of copying and erasing, the process may go to step S87.

Figure 9:
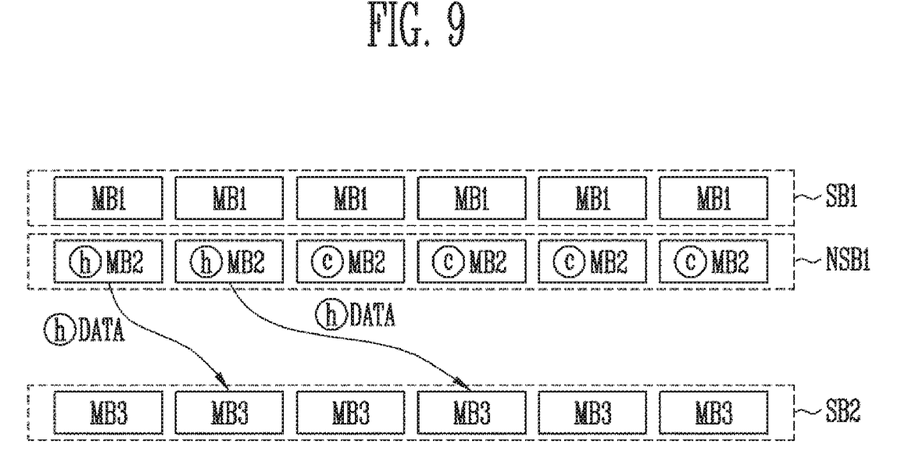
FIG. 9 is a diagram illustrating an operation of copying hot data to a super block in accordance with an embodiment of the present disclosure.

FIG. 9 is a diagram illustrating an operation of copying hot data to a super block in accordance with an embodiment of the present disclosure.

In FIG. 9, memory blocks included in the first super block SB1 are first memory blocks MB1, memory blocks included in the first non-super block NSB1 are second memory blocks MB2, and memory blocks included in the second super block SB2 are third memory blocks MB3.

Memory blocks in which hot data (h)DATA is stored may be included in the second memory blocks MB2 included in the first non-super block NSB1, and memory blocks in which cold data is stored may be included in the second memory blocks MB2 included in the first non-super block NSB1.

As described with reference to FIG. 8, the hot data (h)DATA in the first non-super block NSB1 is copied to the third memory blocks MB3 included in the second super block SB2. Thus, hot data (h)DATA can be managed by being gathered in the second super block SB2. That is, since hot data (h)DATA scattered in non-super blocks can be gathered in a super block, the hot data (h)DATA can be read through a super block which improves read operation performance as compared with the non-super blocks. Accordingly, the operation speed of the memory system can be improved.

Figure 10:
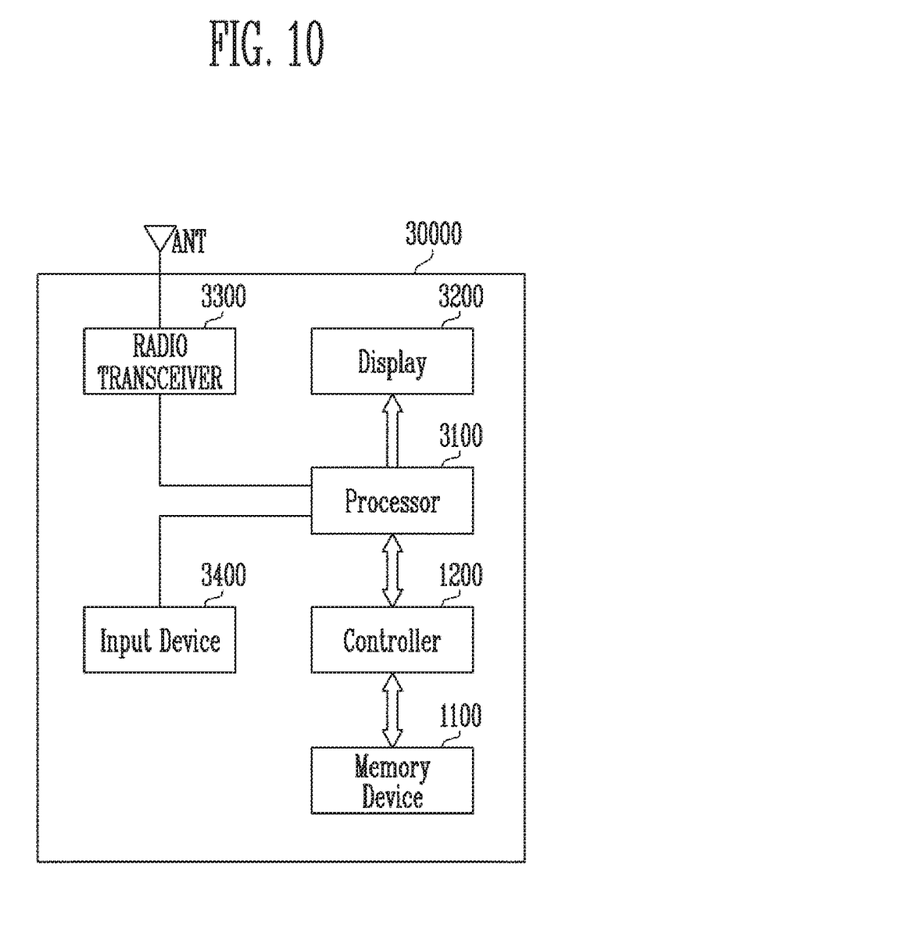
FIG. 10 is a diagram illustrating another embodiment of the memory system including the controller shown in FIG. 1.

FIG. 10 is a diagram illustrating another embodiment of the memory system including the controller shown in FIG. 1.

Referring to FIG. 10, the memory system 30000 may be implemented as a cellular phone, a smart phone, a tablet PC, a personal digital assistant (PDA), or a wireless communication device. The memory system 30000 may include a memory device 1100 and a controller 1200 capable of controlling an operation of the memory device 1100. The controller 1200 may control a data access operation of the memory device 1100, e.g., a program operation, an erase operation, a read operation, or the like under the control of a processor 3100.

Data programmed in the memory device 1100 may be output through a display 3200 under the control of the controller 1200.

A radio transceiver 3300 may transmit/receive radio signals through an antenna ANT. For example, the radio transceiver 3300 may change a radio signal received through the antenna ANT into a signal that can be processed by the processor 3100. Therefore, the processor 3100 may process a signal output from the radio transceiver 3300 and transmit the processed signal to the controller 1200 or the display 3200. The controller 1200 may transmit the signal processed by the processor 3100 to the memory device 1100. Also, the radio transceiver 3300 may change a signal output from the processor 3100 into a radio signal, and output the changed radio signal to an external device through the antenna ANT. An input device 3400 is a device capable of inputting a control signal for controlling an operation of the processor 3100 or data to be processed by the processor 3100, and may be implemented as a pointing device such as a touch pad, a computer mouse, a keypad, or a keyboard. The processor 3100 may control an operation of the display 3200 such that data output from the controller 1200, data output from the radio transceiver 3300, or data output from the input device 3400 can be output through the display 3200.

In some embodiments, the controller 1200 capable of controlling an operation of the memory device 1100 may be implemented as a part of the processor 3100, or be implemented as a chip separate from the processor 3100.

Figure 11:
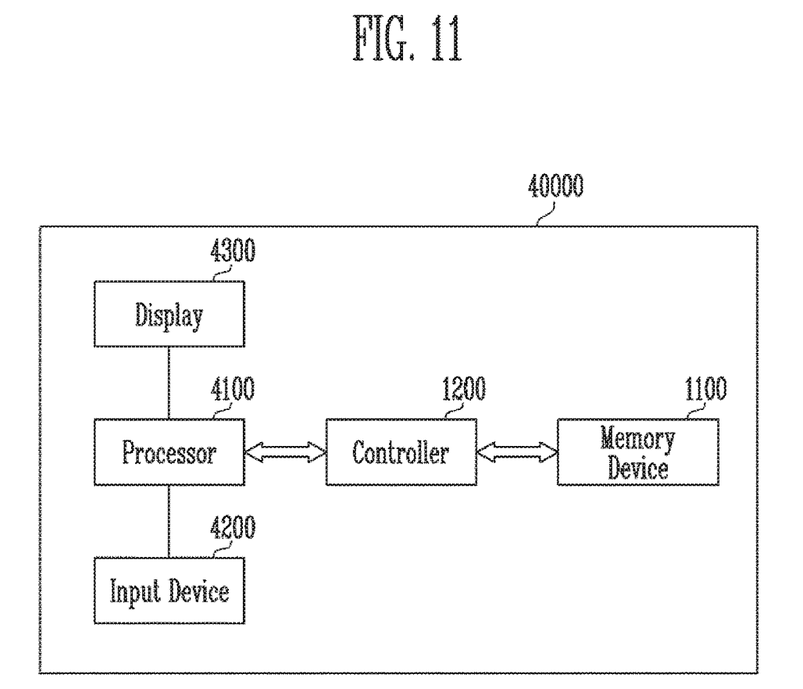
FIG. 11 is a diagram illustrating another embodiment of the memory system including the controller shown in FIG. 1.

FIG. 11 is a diagram illustrating another embodiment of the memory system including the controller shown in FIG. 1.

Referring to FIG. 11, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 configured to store data and a controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad, a computer mouse, a keypad, or a keyboard.

The processor 4100 may control overall operations of the memory system 40000, and control an operation of the controller 1200. In some embodiments, the controller 1200 capable of controlling an operation of the memory device 1100 may be implemented as a part of the processor 4100, or be implemented as a chip separate from the processor 4100.

Figure 12:
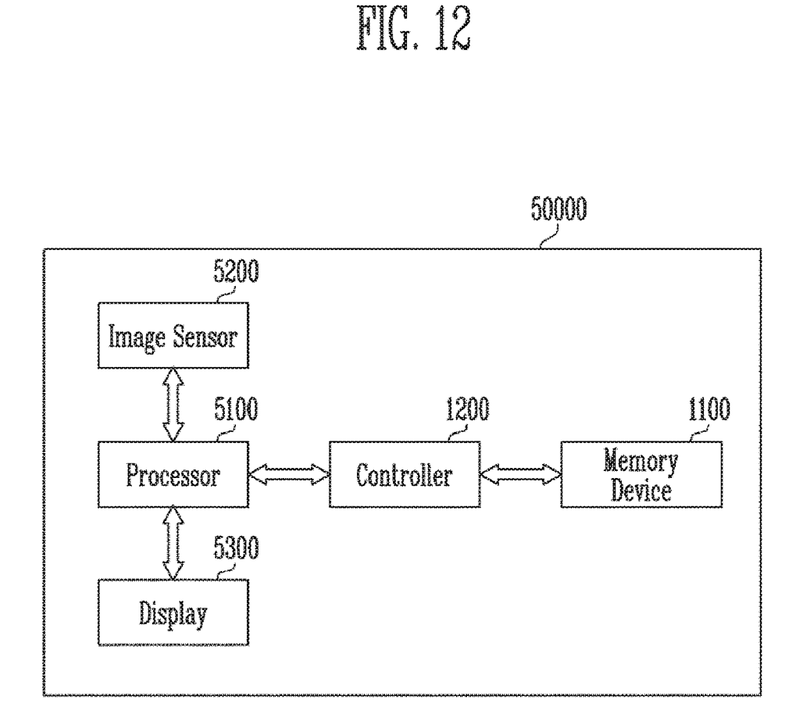
FIG. 12 is a diagram illustrating another embodiment of the memory system including the controller shown in FIG. 1.

FIG. 12 is a diagram illustrating another embodiment of the memory system including the controller shown in FIG. 1.

Referring to FIG. 12, the memory system 50000 may be implemented as an image processing device, e.g., a digital camera, a smart phone having a digital camera attached thereto, or a tablet PC having a digital camera attached thereto.

The memory system 50000 may include a memory device 1100 and a controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the memory device 1100 through the controller 1200. In addition, data stored in the memory device 1100 may be output through the display 5300 under the control of the processor 5100 or the controller 1200.

In some embodiments, the controller 1200 capable of controlling an operation of the memory device 1100 may be implemented as a part of the processor 5100, or be implemented as a chip separate from the processor 5100.

Figure 13:
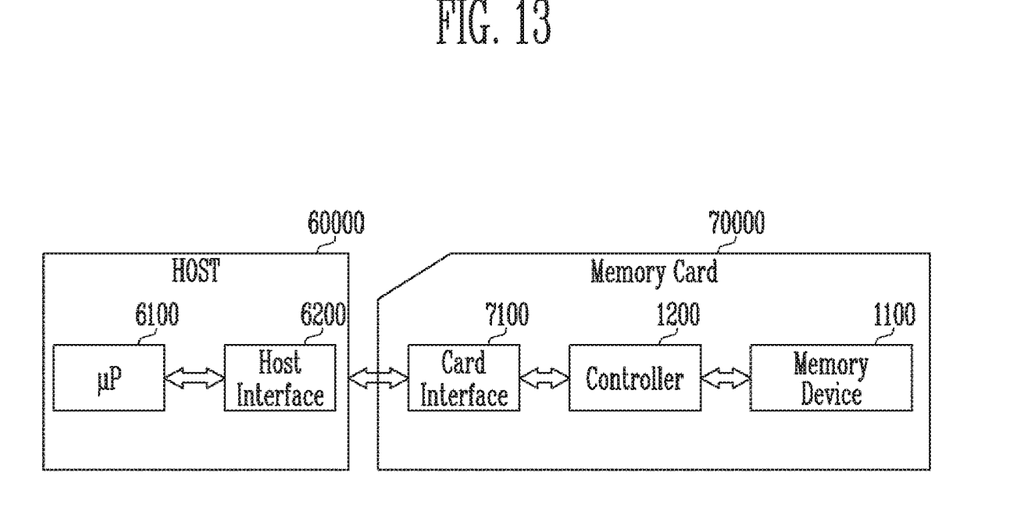
FIG. 13 is a diagram illustrating another embodiment of the memory system including the controller shown in FIG. 1.

FIG. 13 is a diagram illustrating another embodiment of the memory system including the controller shown in FIG. 1.

Referring to FIG. 13, the memory system 70000 may be implemented as a memory card or a smart card. The memory system 70000 may include a memory device 1100, a controller 1200, and a card interface 7100.

The controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between the host 60000 and the controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the controller 1200 under the control of a microprocessor (μP) 6100.

In accordance with the present disclosure, hot data stored in a non-super block is extracted, and the extracted hot data is moved to a super block, so that the performance of the memory system can be improved.

Example embodiments have been disclosed herein, and although specific terms are employed, the embodiments are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A controller comprising:
an internal memory configured to store status information comprising a block type indicating whether a group of memory blocks is a super block or a non-super block, and a block read count value corresponding to the group indicating a number of times that a read operation is performed on the group; and
a processor configured to:
identify data stored in the memory blocks as hot data or cold data, according to a comparison result of a hot/cold reference value, and a difference value of the block read count value of an individual memory block with the non-super block and a system read count value of a memory system comprising the memory blocks, and
copy the hot data or cold data stored in the non-super block to the super block based on the block type.

2. The controller of claim 1, wherein the internal memory stores a reclaim trigger reference corresponding to the super block or the non-super block and the system read count value.

3. The controller of claim 2,
wherein the reclaim trigger reference corresponds to the super block or the non-super block at a point in time when the memory blocks are allocated to one of the super block and the non-super block,
wherein the block read count value of each memory block within the non-super block is a read count value of the memory block at the point in time when the memory blocks are allocated to one of the super block and the non-super block, and
wherein the system read count value is an accumulated count value of read operations performed by the memory system including the memory blocks.

4. The controller of claim 3,
wherein the processor comprises:

a super block manager configured to update the reclaim trigger reference based on an index which changes when the super block changes into a non-super block or when the non-super block changes into a super block, and a read counter configured to update the block read count value and the system read count value.

5. The controller of claim 4, wherein the super block manager determines the data stored in each memory block within the non-super block as the hot data or the cold data, by comparing the difference value obtained by subtracting the block read count value of the memory block from the system read count value with the reference value.

6. The controller of claim 5, wherein the super block manager copies, to the super block, the hot data stored in the non-super block.

7. The controller of claim 5, wherein the super block manager changes the super block reclaim trigger reference of the non-super block to the non-super block reclaim trigger reference when all memory blocks store the cold data within the non-super block.

8. The controller of claim 1, further comprising a command generator configured to generate and output a command to copy the hot data stored in the non-super block to the super block.

9. A memory system comprising:
a memory device including a plurality of memory blocks in which data is stored; and
a processor configured to:
identify data stored in the memory blocks as hot data or cold data, according to a comparison result of a hot/cold reference value, and a difference value of a block read count value of an individual memory block with a non-super block and a system read count value of the memory system, and
control the memory device to copy the hot data or cold data stored in memory blocks included in the non-super block to memory blocks included in a super block, from among the memory blocks,
wherein the memory blocks included in the super block are capable of operating simultaneously.

10. The memory system of claim 9, wherein the processor performs an operation of copying the hot data as a background operation.

11. The memory system of claim 10, further comprising:
an internal memory configured to store a reclaim trigger reference of the memory blocks, the block read count value for each of the memory blocks, and the system read count value,
wherein the processor includes:
a read counter configured to store the block read count value and the system read count value in the internal memory by counting a number of times that a read operation is performed in the memory blocks; and
a super block manager configured to store a super block reclaim trigger reference or a non-super block reclaim trigger reference of the memory blocks, and divide the data into the hot data and the cold data.

12. The memory system of claim 11, wherein the super block manager compares the difference value obtained by subtracting the block read count value for each of the memory blocks from the system read count value, with the reference value, and determines the data stored in the memory block as the hot data or the cold data, based on the comparison result.

13. The memory system of claim 11, wherein the super block manager copies the hot data stored in memory blocks of the non-super block to the super block.

14. The memory system of claim 11, wherein the super block manager changes the super block reclaim trigger reference of the non-super block to the non-super block reclaim trigger reference when all memory blocks store the cold data within the non-super block.

15. A method for operating a memory system, the method comprising:
updating status information of memory blocks, whenever a read operation of the memory blocks is performed;
determining data stored in the memory blocks as hot data or cold data, according to a comparison result of a hot/cold reference value, and a difference value of a block read count value of an individual memory block with a non-super block and a system read count value of the memory system included in the status information, when a number of times that the read operation is performed on a memory block reaches a reference number of times among the memory blocks; and
copying, to memory blocks included in a super block, the hot data or cold data stored in a memory block included in the non-super block, from among the memory blocks,
wherein the memory blocks included in the super block are capable of operating simultaneously.

16. The method of claim 15, wherein the status information includes:
a super block reclaim trigger reference or a non-super block reclaim trigger reference for the memory blocks at a point in time when the memory blocks are allocated to one of the super block and the non-super block;
the block read count value for each of the memory blocks at the point of time when the memory block is allocated to one of the super block and the non-super block; and
the system read count value that is an accumulated count value of a read operation performed by the memory system.

17. The method of claim 16, wherein the data stored in each of the memory blocks is determined as the hot data or the cold data by comparing the difference value obtained by subtracting the block read count value from the system read count value with the reference value.

18. The method of claim 17,
wherein the data stored in a memory block is determined as the hot data when the difference value obtained by subtracting the block read count value of the memory block from the system read count value is less than the reference value; and
wherein the data stored in a memory block is determined as the cold data when the difference value obtained by subtracting the block read count value of the memory block from the system read count value is equal to or greater than the reference value.

* * * * *